US005712041A

United States Patent [19]
Breant et al.

[11] Patent Number: 5,712,041
[45] Date of Patent: Jan. 27, 1998

[54] PACKAGING MATERIAL COMPRISING A SILICON OXIDE LAYER AND A POLYOLEFIN LAYER

[75] Inventors: Patrice Breant, Serquigny; Philippe Tordjeman, Billere, both of France

[73] Assignee: Elf Atochem S.A., Puteaux, France

[21] Appl. No.: 591,873

[22] Filed: Jan. 25, 1996

[30] Foreign Application Priority Data

Jan. 26, 1995 [FR] France ................. 95 00879

[51] Int. Cl.$^6$ ................. B32B 27/30; B32B 27/32; B32B 27/34; B32B 27/36
[52] U.S. Cl. ................. 428/451; 428/34.8; 428/35.2; 428/516; 428/520
[58] Field of Search ................. 428/35.3, 451, 428/520, 516, 34.8, 35.2

[56] References Cited

U.S. PATENT DOCUMENTS 4,528,234  7/1985  Kaiho et al. ................. 428/216
5,100,720  3/1992  Sawada et al. ................. 428/215

FOREIGN PATENT DOCUMENTS 0311432  4/1989  European Pat. Off. .
0619178  10/1994  European Pat. Off. .
3300411  7/1983  Germany .

*Primary Examiner*—D. S. Nakarani
*Attorney, Agent, or Firm*—Pennie & Edmonds LLP

[57] ABSTRACT

The invention relates to a material comprising a film covered with silicon oxide and a polyolefin film such that the binder arranged between the silicon oxide and the polyolefin film is a thermoplastic resin containing at least one hydroxyl functional group.

This material is useful for manufacturing food packagings in the form of cartons.

11 Claims, No Drawings

PACKAGING MATERIAL COMPRISING A SILICON OXIDE LAYER AND A POLYOLEFIN LAYER

BACKGROUND OF THE INVENTION

The present invention relates to a packaging material comprising a silicon oxide layer and a polyolefin layer.

It more particularly relates to a structure comprising a film covered with silicon oxide and a polyolefin film, an adhesive binder being arranged between the silicon oxide and the polyolefin film. It is possible, for example, as regards the polyolefin film, to hot-bond this material to cardboard and then to cover each face of the combined unit obtained with a polyethylene sheet.

These materials are useful for manufacturing packagings for liquid foodstuffs in the form of cartons.

The inventors have now discovered that binders based on polymers containing hydroxyl functional groups made it possible to render materials resistant to delamination.

DESCRIPTION OF RELATED ART

JP 03099842 (Kokai), published on 25 Apr. 1991, describes EVOH/vinylsilane films covered with silicon oxide, on which films is bonded a polypropylene sheet using a urethane adhesive. It is difficult to deposit an adhesive evenly and continuously in a sufficient amount. The result is either a lack of adhesion or an excess of adhesive which damages the material.

JP 05330568 (Kokai), published on 14 Dec. 1993, describes polyester films covered with silica, on which films is bonded a sheet of ethylenic resin using an adhesive which is an ethylene/maleic anhydride/ethyl acrylate copolymer. Adhesion is unsatisfactory.

SUMMARY OF THE INVENTION

The present invention is a material comprising a film covered with silicon oxide and a polyolefin film such that the binder arranged between the silicon oxide and the polyolefin film is a thermoplastic resin containing at least one hydroxyl functional group.

The film covered with silicon oxide is known in the prior art. It is, for example, a film of polyester such as poly(ethylene terephthalate) (PET) or poly(butylene terephthalate) (PBT) or polyamide (PA).

The silicon oxide film is, for example, a monomolecular layer or a layer up to 5000 angstroms in thickness. It can be deposited by a plasma, evaporation or any other means.

By way of example, the thickness of the film covered with silicon oxide is between 5 and 200 μm.

The polyolefin film, is, for example, made of polyethylene, polypropylene or copolymers of ethylene such as ethylene/propylene, ethylene/butene, ethylene/hexene or ethylene/propylene/butene copolymers or copolymers of ethylene with at least one product chosen from (i) vinyl esters of saturated carboxylic acids or (ii) esters and salts of unsaturated carboxylic acids.

DETAILED DESCRIPTION

It would not be departing from the scope of the invention if the film comprised, in addition to a polyolefin, other polymers, optionally compatibilizing agents, so that the mixture is sufficiently homogeneous to be converted and used in the form of a film. It can also comprise a mixture of polyolefins.

By way of example, the thickness of this film can be between 5 and 5000 μm. The thermoplastic resin containing at least one hydroxyl functional group can be a polymer having a hydroxyl functional group, a mixture of polymers each having at least one hydroxyl functional group or a mixture of a polymer having at least one hydroxyl functional group with another polymer or any other combination.

Advantageously, the resin comprises units derived from at least one olefin or polyolefin chains.

The hydroxyl functional group is integrated with the polymer either by polymerization or by grafting of one or of a number of appropriate monomers or by chemical modification of an appropriate functional group already present in the polymer.

The various reactions (polymerization, grafting or modification) are carried out according to the rules of the art in the solid or molten state or in solution.

The hydroxyl functional group is generally introduced either by functional acrylic monomers such as, for example, HEA or HEMA (hydroxyethyl acrylate or methacrylate) or by alcohols carrying a polymerizable or graftable functional group (for example vinyl), such as, for example, vinylphenol. These monomers can also carry other functionalities which have little or no reactivity with the hydroxyl functional groups, such as an amide, an amine, and the like.

The hydroxyl functional group can also be obtained from an appropriate functional group already present in the polymer via an appropriate reaction, such as, for example, the catalysed hydrolysis of a vinyl alkylate functional group.

Other monomers can also be present in the polymer, such as one or a number of olefins (ethylene, propylene, butene, hexene, octene, 4-methylpentene, vinylnorbornene, and the like), an alkyl acrylate or methacrylate or a vinyl alkylate. These monomers can be present jointly.

The products obtained can be used alone or as a mixture with polymers themselves containing or not containing hydroxyl functional groups. The use of an additive or of another polymer may be necessary in the case of the mixtures in order to ensure good mixing and good compatibilization of the polymers.

Poly(hydroxyethyl acrylate or methacrylate)s are not always thermoplastic. It is therefore advantageous to mix them with other polymers so that the resin has a thermoplastic nature. As the resin is thermoplastic, it can be easily converted into a film in order to be, for example, coextruded with the polyolefin. The polyolefin/resin double layer comprising hydroxyls is then hot-bonded to the film covered with silicon oxide in order to manufacture the material of the invention.

It is also possible, even if the polymer having at least one hydroxyl functional group is thermoplastic, to mix it with other thermoplastic polymers.

Mention may be made, as examples of polymers which can be mixed with the polymers having a hydroxyl functional group, of:

polyethylene or polypropylene;

copolymers of ethylene with at least one product chosen from (i) salts and esters of unsaturated carboxylic acids, (ii) vinyl esters of saturated carboxylic acids or (iii) alpha-olefins, it being possible for the monomers (i) to (iii) to be grafted or copolymerized;

styrene/ethylene-butene/styrene (SEBS) block copolymers;

styrene/butadiene/styrene (SBS) block copolymers;

styrene/isoprene/styrene (SIS) block copolymers.

The composition of the mixtures, the comonomer content, the amount of hydroxyl functional groups and the structure of the polymers is optimized with respect to the desired adhesion and implementational properties.

It may be necessary to add compatibilizing agents to the resin in order to promote the homogeneity of the resin. These products are known per se and they are, for example, functionalized polyolefins such as the copolymers of ethylene with at least one product chosen from (i) unsaturated carboxylic acids, their salts or their esters, (ii) unsaturated dicarboxylic acids, their salts, their esters, their hemiesters or their anhydrides, (iii) vinyl esters of saturated carboxylic acids, (iv) unsaturated epoxides or (v) alpha-olefins, it being possible for the monomers (i) to (v) to be grafted or copolymerized.

Mention may be made, as examples of thermoplastic resins containing at least one hydroxyl functional group, of:

the mixtures:
of ethylene/vinyl alcohol (EVOH) copolymers or of poly(hydroxyethyl (meth)acrylate); and of at least one product chosen from:
the copolymers of ethylene with at least one product chosen from (i) unsaturated carboxylic acids, their salts or their esters, (ii) unsaturated dicarboxylic acids, their salts, their esters, their hemiesters or their anhydrides, (iii) vinyl esters of saturated carboxylic acids or (iv) unsaturated epoxides, it being possible for the monomers (i) to (iv) to be grafted or copolymerized;
polyethylenes or copolymers of ethylene and of alpha-olefins the mixtures of:
polyethylene or of copolymers of ethylene with esters of unsaturated carboxylic acids or of copolymers of ethylene with vinyl esters of saturated carboxylic acids;
polyethylene or copolymers of ethylene and of alpha-olefins; these polymers being, one or the other or both separately or simultaneously, grafted with hydroxethyl (meth)acrylate;
the partially or totally hydrolysed ethylene/vinyl acetate copolymers, it also being possible for these copolymers to contain alkyl (meth)acrylate.

Use is advantageously made of the following resins:
the mixtures of:
ethylene/alkyl (meth)acrylate copolymers;
EVOH
ethylene/alkyl (meth)acrylate/maleic anhydride or glycidyl (meth)acrylate copolymers;
the mixtures of:
ethylene/alkyl (meth)acrylate copolymers or polyethylene;
EVOH
polyethylene (for example linear low density polyethylene) grafted by maleic anhydride;
EPR (ethylene/propylene) elastomer;
the mixtures of:
ethylene/alkyl (meth)acrylate copolymers;
poly(hydroxyethyl (meth)acrylate);
the mixtures of:
ethylene/alkyl (meth)acrylate copolymers;
ethylene/alpha-olefin copolymers; these copolymers being, one or the other or both separately or simultaneously, grafted by hydroxyethyl (meth) acrylate;
the ethylene/vinyl acetate/vinyl alcohol/alkyl (meth) acrylate copolymers.

By way of example, the thickness of this binder film can be between 5 and 50 μm.

The polymers of the film covered with silicon oxide, of the polyolefin film and of the thermoplastic resin containing at least one hydroxyl functional group can comprise all the additives which could be used for improving the thermal behaviour, the UV resistance or the implementation thereof, for example (antioxidant, anti-UV, processing aid, inorganic filler, and the like).

The materials of the invention can be manufactured according to the known techniques for thermoplastics.

The film covered with silicon oxide can be laminated with a polyolefin/resin containing hydroxyl functional group double-layer film.

The materials of the invention can be used as such or else combined with other materials such as polymer films or sheets or cardboard by heat sealing, bonding or coextrusion in order to make food packagings.

EXAMPLES

The Melt Flow Indices (MFI) are expressed in dg/min under 2.16 kg at 190° C.

The following products were used:

Lotader A is an ethylene/butyl acrylate/maleic anhydride copolymer containing 5% by weight of acrylate and 3% by weight of anhydride and with an MFI=5;

Orevac A is a polyethylene grafted by 0.3% by weight of maleic anhydride and with an MFI=1;

Soarnol A is an EVOH containing 44% of ethylene with an MFI=4;

Paratone 8900 is an EPR with an Mn=20.000 containing 30% of propylene;

Lacqtene LA0710 is an autoclave high pressure radical polyethylene with an MFI=7 and with a density=0.917 g/cm$^3$;

15MA03 is an ethylene/methyl acrylate copolymer containing 15% of methyl acrylate with an MFI=3;

the Stamylex is the 080876F, a linear copolymer of ethylene and of octene with a density of 0.910 g/cm$^3$ and with an MFI=6. It has been grafted simultaneously with 15MA03 by HEA in the presence of dicumyl peroxide. The polymer obtained contains, by weight, 89% of ethylene copolymers and 11% of grafts;

EVAOH denotes an EVA (ethylene/vinyl acetate) containing 28 mass % of acetate partially hydrolysed by transesterification in the presence of dibutyltin dilaurate and butanol.

EXAMPLE 1

The following resins were prepared:

| POLYMERS | COMPOSITIONS in Weight % | Peel force N/25 mm |
| --- | --- | --- |
| 15MA03 | 65 | Resistant to delamination |
| EVOH = Soarnol A | 30 | |
| Lotader A | 5 | |
| 15MA03 | 40 | Resistant to delamination |
| EVOH = Soarnol A | 50 | |
| Lotader A | 10 | |
| Lacqtene LA710 | 30 | Resistant to delamination |
| EPR = Paratone | 10 | |
| EVOH = Soarnol A | 50 | |
| Orevac A | 10 | |
| 15MA03 + Stamylex | 90 | Resistant to delamination |
| HEA graft | 10 | |
| EVAOH | 100 | 1.5 |

Spools of PET film coated with silicon oxide were prepared. The plasma-deposited silicon oxide layer was 200 angströms and the PET was 12 μm.

Various binders were prepared which were either coextruded or heat-sealed on the above films. Adhesion was measured by peeling the binder film and the PET film covered with silicon oxide at the rate of 100 mm/min for a width of 25 mm.

When it was impossible to delaminate the binder film from the PET film covered with silicon oxide, tearing of the PET film took place.

By way of comparison, three other binders composed of the following polymers and not containing hydroxyl functional groups were prepared:

29MA03, identical to 15MA03 except that it contains 29% of methyl acrylate.

Lotader B, identical to Lotader A except that the melting temperature and the Vicat point are 20° C. lower.

Orevac B is an ethylene/methyl acrylate copolymer containing 29% of acrylate grafted by maleic anhydride.

The following peel forces were obtained:

| BINDERS | 29MA03 | Lotader B | Orevac B |
| --- | --- | --- | --- |
| Peel force (N/25 mm) | <0.5 | 3 | 1.2 |

These binders are not very good adhesive binders.

We claim:

1. Material comprising a film covered with silicon oxide and a polyolefin film such that the binder arranged between the silicon oxide and the polyolefin film is a thermoplastic resin containing at least one hydroxyl functional group.

2. Material according to claim 1, in which the film covered with silicon oxide comprises poly (ethylene terephthalate) and the polyolefin film comprises a polymer selected from the group consisting of polyethylene and a copolymer of ethylene with a monomer selected from the group consisting of (i) vinyl esters of saturated carboxylic acids, (ii) esters and salts of unsaturated carboxylic acids, and (iii) alpha-olefins.

3. Material according to claim 1, in which the hydroxyl functional group of the binder arises from vinyl alcohol.

4. Material according to claim 1, in which the hydroxyl functional group of the binder arises from hydroxyethyl (meth)acrylate.

5. Packaging comprising a material according to claim 1.

6. The material according to claim 1, wherein the film covered with silicon oxide comprises poly (ethylene terephthalate).

7. The material according to claim 1, wherein the film covered with silicon oxide comprises a member selected from the group consisting of poly(butylene terephthalate) and polyamide.

8. The material according to claim 1, wherein the polyolefin film comprises a polymer selected from the group consisting of polyethylene and polypropylene.

9. The material according to claim 1, wherein the polyolefin film comprises a polymer selected from the group consisting of polyethylene and a copolymer of ethylene with a monomer selected from the group consisting of (i) vinyl esters of saturated carboxylic acids, (ii) salts and esters of unsaturated carboxylic acids, and (iii) alpha-olefins.

10. The material according to claim 1, wherein the polyolefin film comprises a copolymer comprising ethylene and at least one monomer selected from the group consisting of propylene, butene, and hexene.

11. The material according to claim 1, wherein the hydroxyl functional group is introduced by a molecule selected from the group consisting of hydroxyethyl acrylate, hydroxyethyl methacrylate, and vinylphenol.

* * * * *